(12) United States Patent
Hains

(10) Patent No.: US 6,442,300 B1
(45) Date of Patent: Aug. 27, 2002

(54) THREE-PIXEL LINE SCREEN WITH HIGH ADDRESSABILITY AND ERROR DIFFUSION

(75) Inventor: Charles M. Hains, Altadena, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/225,667

(22) Filed: Jan. 5, 1999

(51) Int. Cl.$^7$ .................................................. G06K 1/38
(52) U.S. Cl. ...................................... 382/252; 382/237
(58) Field of Search .................. 358/1.9, 429, 456–459, 358/534–536; 382/237, 251, 253

(56) References Cited

U.S. PATENT DOCUMENTS

| | | | | |
|---|---|---|---|---|
| 5,317,653 A | * | 5/1994 | Eschbach et al. ............. 382/50 |
| 5,438,431 A | * | 8/1995 | Ostromoukhov ............ 358/457 |
| 5,444,551 A | * | 8/1995 | Miller et al. ................. 358/456 |
| 5,489,991 A | * | 2/1996 | McMurray et al. .......... 358/456 |
| 5,625,716 A | * | 4/1997 | Borg ............................ 382/254 |
| 5,808,755 A | * | 9/1998 | Delabastita ................. 358/454 |
| 6,122,407 A | * | 9/2000 | Peters ......................... 382/270 |
| 6,130,661 A | * | 10/2000 | Ilbery ......................... 345/147 |

* cited by examiner

*Primary Examiner*—Thomas D. Lee
*Assistant Examiner*—Stephen Brinich

(57) ABSTRACT

A method of generating one image dot from three image pixels. The values of the three pixels are summed. If the sum indicates a dot that is equal to or darker than ⅔ black, the two outer thirds of the dot are set to black and the central third is set to a shade of gray. If the sum indicates a dot that is equal to or lighter than ⅓ white, central third of the dot is set to white and the outer two thirds are set to a shade of gray. The shades of gray are generated by using high addressability, and error diffusion is used to diffuse the rounding off errors implicit in the high addressability process.

7 Claims, 8 Drawing Sheets

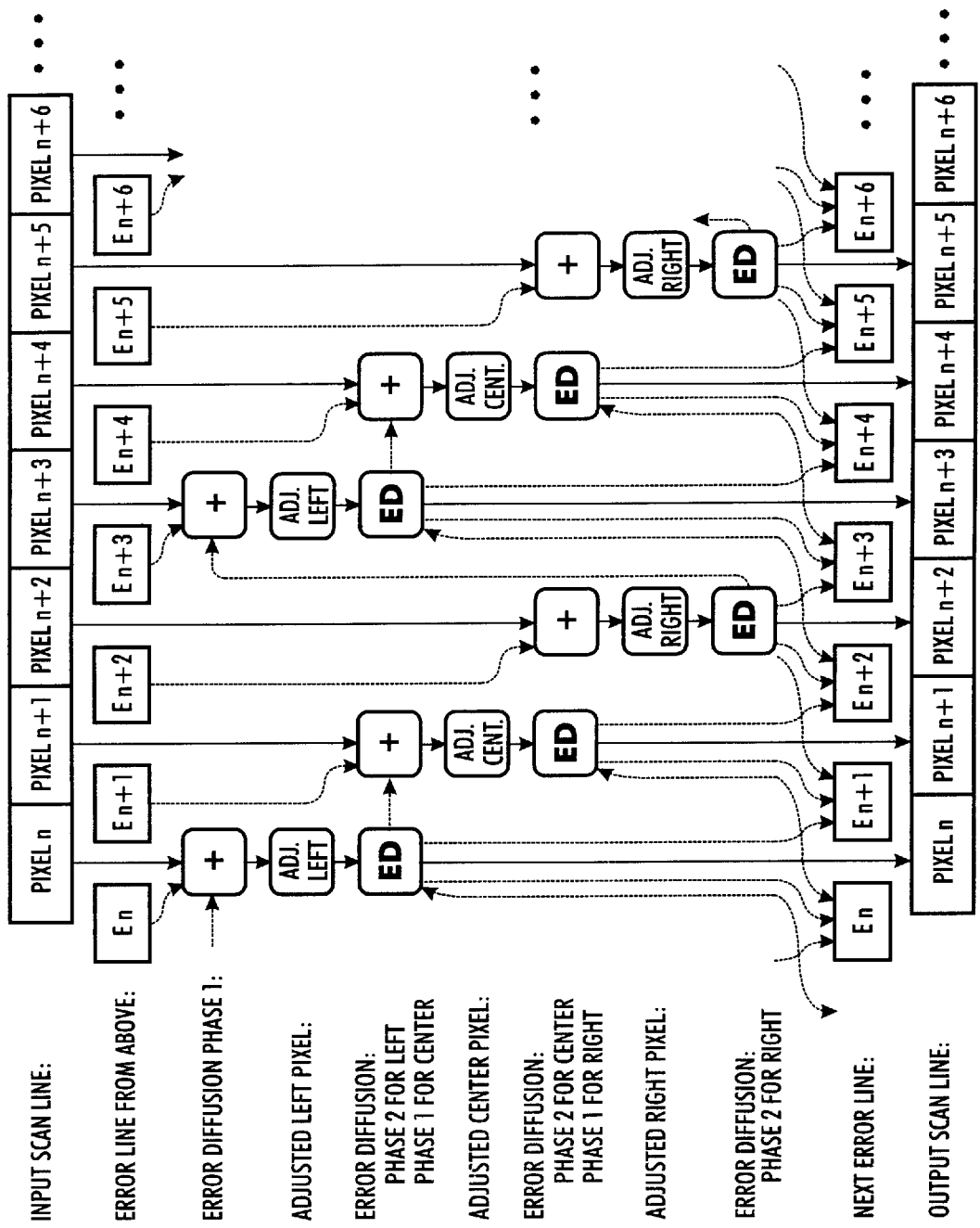

THREE-PIXEL LINE SCREEN WITH HIGH ADDRESSABILITY AND ERROR DIFFUSION

BACKGROUND OF THE INVENTION

A method of generating one dot for each three pixels on one line of an image to be printed to lower the frequency of the image while keeping the detail, the dot having either an all-white central portion or two all-black end portions.

For maintaining sharp edges for printed text and line graphics it is necessary to have a large number of pixels per inch, and yet there is an upper limit to the number of dots per inch that can be used to print xerographic images that are received as grayscale. A common example is the technique of clustering where an 8 by 8 pixel screen is used to reduce sixty-four 8-bit pixels to one halftone dot.

One prior art method of improving the apparent amount of detail in a dot image without changing the dot frequency is high addressability. Here, the printing system may have a number of dots per inch that is so low that diagonal lines appear jagged to the eye. Increasing the number of dots per inch is clearly an improvement, but is expensive. A lower cost alternative is to divide up each dot at the printer into a number of parts, and to control each part separately, to result in dots that are larger or smaller than the originals. When correctly done, it enhances image quality without incurring the cost of increasing the number of dots per inch.

An additional prior art technique to improve image quality is error diffusion. If a highly precise quantity must be approximated by an image dot of lower precision, the error term is carried to the next dot and to the dots on the next raster. In this way, the precision is not lost. This process is described in detail in U.S. Pat. No. 5,317,653, which is incorporated by reference herein.

SUMMARY OF THE INVENTION

This invention combines high addressability, error diffusion and clustering to maintain as much high-frequency image quality as possible while reducing a number of pixels to one dot. It is thus applicable for scanned images containing much detail, as well as text, line art and previously generated halftones.

Any number of pixels can be combined using this method, but three pixels will be used as a numerical example for this discussion. This clustering process first adds the three pixels to form one number which indicates the total amount of black. If the total amount of black is more than $\frac{2}{3}$ of maximum, then each end pixel is set to black and the central pixel will be set to the appropriate shade of gray. Next, high addressability is used to convert the gray central pixel to one having white central sub pixels and black end sub pixels. The three generated pixels are then connected, which forms one dot for the three-pixel line having a central white portion and black end portions.

If the total amount of black is less than $\frac{2}{3}$ of maximum, then the central pixel is set to white and the end pixels are set to shades of gray. Next, the left gray pixel is converted into a set of sub pixels where there are white sub pixels to the right of the black, and the right gray pixel is converted into a set of sub pixels where there are white sub pixels to the left of the black. The three generated pixels are then connected, which again forms a dot for the three-pixel line having a central white portion and black end portions.

In this way, dot density is reduced by a factor of three. One advantageous characteristic of this process is that the left and right ends of each dot need not be equal. For example, if the original left pixel of the three is darker than the right, then the left black portion of the dot can be set larger than the right black portion. This increases the preservation of original detail. However, the white portion is always centered so that the white portion can not preserve this detail. The question then arises, whether the center of the dot should be white or black. It was decided that the ends should be black. This way, the greater accuracy is in the highlights, and less in the shadows.

BRIEF DESCRIPTION OF THE DRAWINGS

FIG. 8 is a description of the error diffusion for the process of FIG. 7.

DETAILED DESCRIPTION OF THE INVENTION

Figure 1:
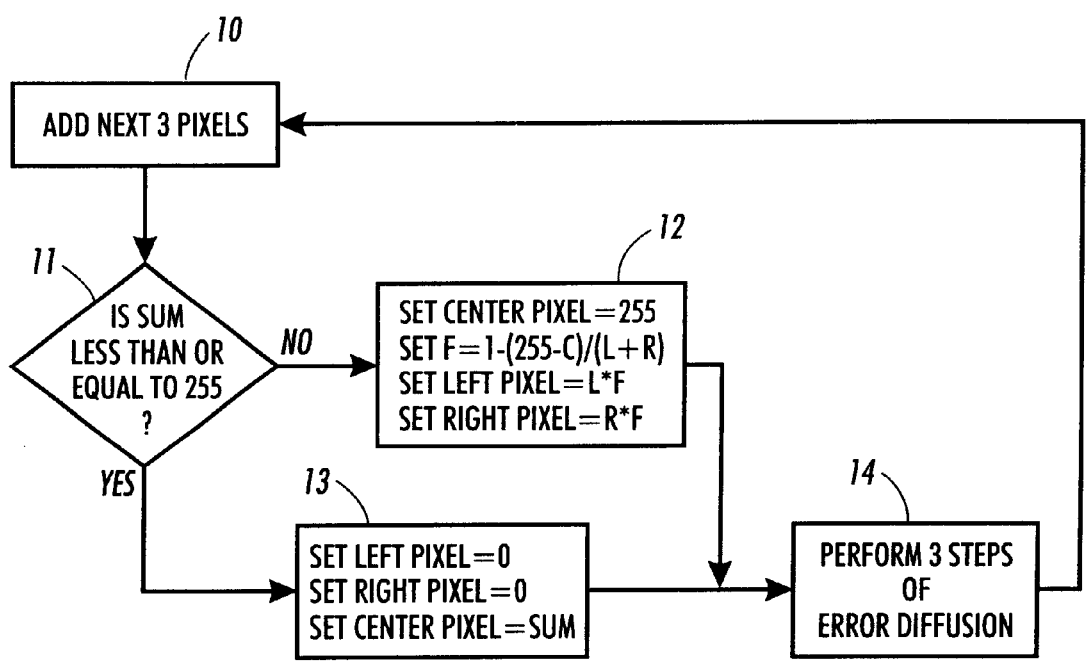
FIG. 1 is a flow chart of the basic process.

FIG. 1 is a flow chart of one embodiment of this invention. In step 10 the numerical value of the eight-bit pixels are added. To use a numerical example, assume the values are 180, 200 and 220. Then the sum=600. At step 11 it is decided that the sum is not less than 255 so at step 12 the center pixel is set to all white (255). The left is set to L×F where F=1−(255−C)/L+R). The left pixel therefore equals 155. The right is set to R×F. The right pixel equals 189. Note that the ratio of the original left and right pixels and the ratio of the resultant left and right ends are the same. That is to say, the fact that the three pixel set is darker on the left has been preserved.

In case the three pixels were much darker, 60, 80 and 100, for example, then the result of the test at step 11 would be "yes" and at step 13 the center pixel would be set at the sum of 240 and the outer thirds would be set to 0, black. In this case there is no possibility of adjusting the asymmetry.

Figure 2:
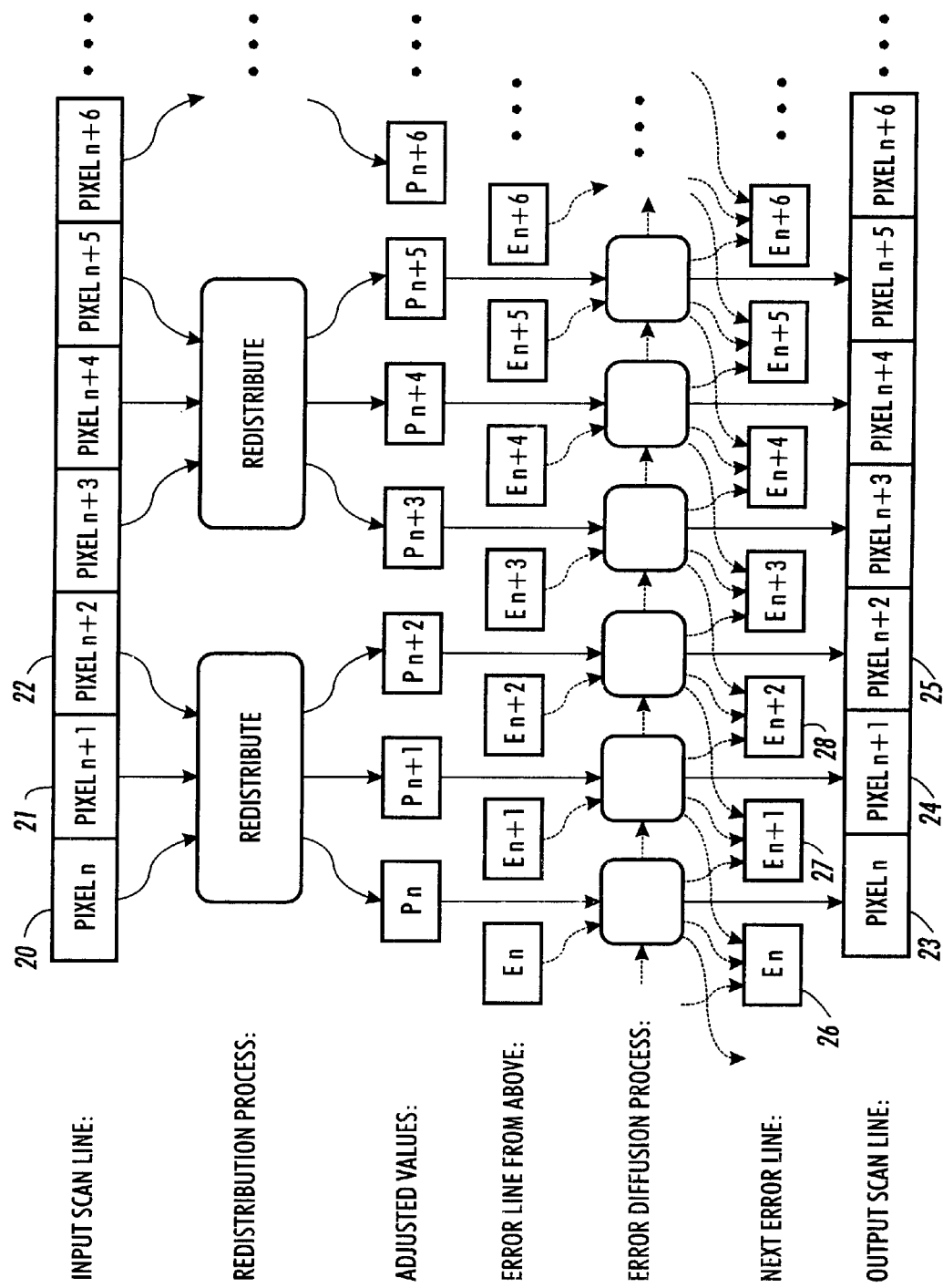
FIG. 2 is a description of the error diffusion for the process of FIG. 1.

Finally, at step 14, the error diffusion takes place, which is described in detail in FIG. 2. The Input Scan Line is a stream of input pixels, the processing of the first three (20, 21, 22) of which will now be described. First, the redistribution process described as steps 10 through 13 of FIG. 1 is performed. The result is three adjusted values each having 8 bits, and corresponding to 256 levels of gray. This line of current pixels is added to the error line of individual error terms produced by the previous line in the error diffusion process, to produce three output pixels 23, 24 and 25, and also four error terms for each pixel. In this described embodiment, each error term is divided into sixteen parts, with seven parts going to the right pixel, one part going down and to the right, five parts going to the error term directly below, and three parts going down and to the left. Finally these parts are added in each error term 26, 27 and 28 to form the next error line.

Figure 3:
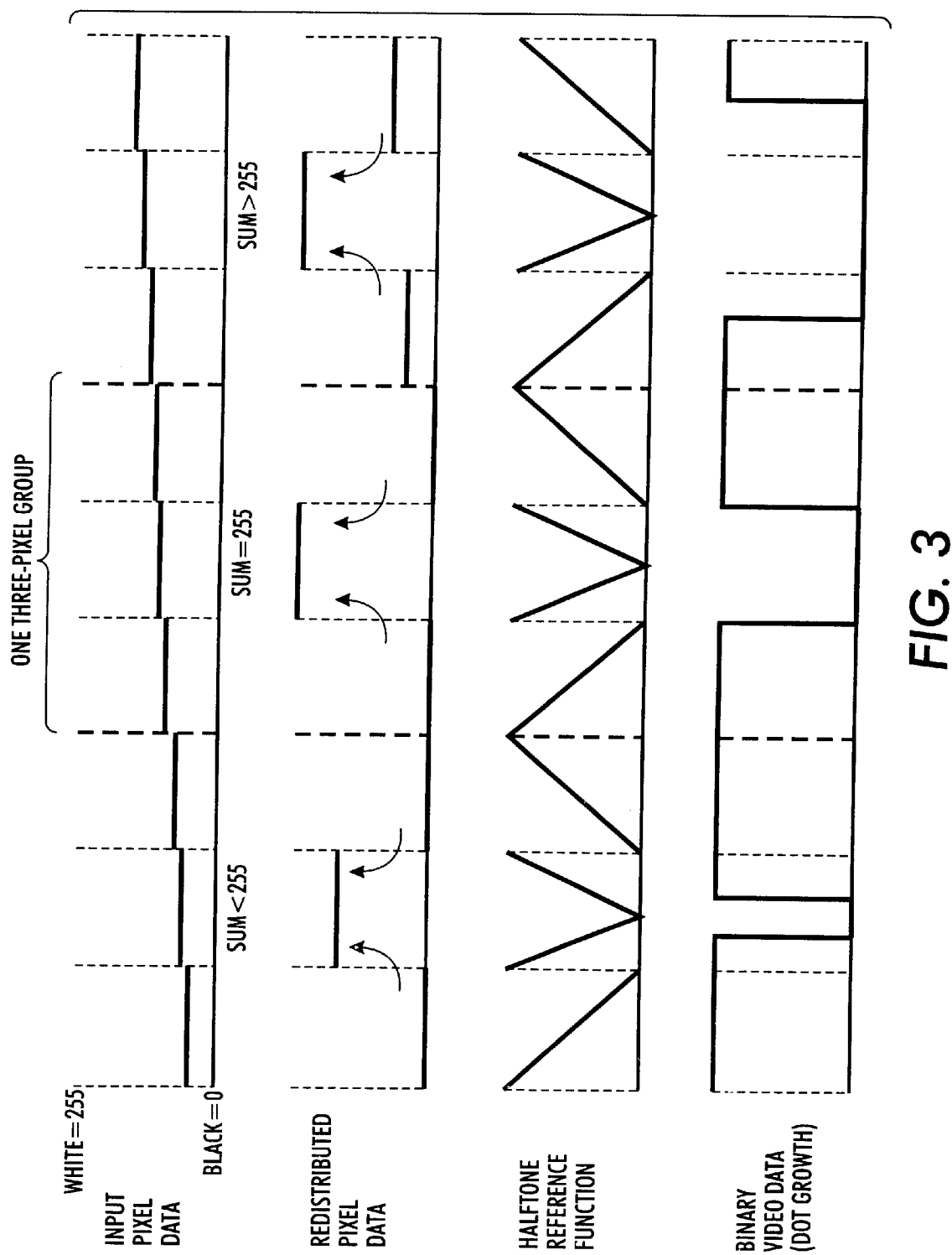
FIG. 3 are the waveshapes for the FIG. 1 process.

FIG. 3 is a set of waveshapes that result from the operation of the process of FIGS. 1 and 2. The input pixel data is that of 9 pixels, arranged in groups of three, proceeding from dark to light gray where 0 is black and 255 is white. The first three are summed to produce a sum less than 255 so the two ends are set to black and the sum of all three pixels is used to produce the central gray level, shown in FIG. 2 as redistributed pixel data. The second three sum to exactly 255 so the ends are black and the center is white. The third three sum to more than 255 so the center is set to white and the two ends are set to the computed gray levels.

The value of each redistributed pixel is now screened by the halftone reference function to produce the dot growth shown as the binary video data. The first pixel has a redistributed value of 0 so it is screened as black video data. The second pixel has a light gray value so it is screened as a pulse width modulated signal that has a white central portion, and is mostly black. The third pixel is identical to the first.

The fourth, fifth and sixth output pixels are pure black, white and black and are shown as such at the video data stage.

The last three output pixels are gray, white and gray. The central pixel is all white, and the two gray pixels are white toward the center and black toward the ends of the dot. The data is distributed so that the left third of the dot is darker than the right.

Figure 4:
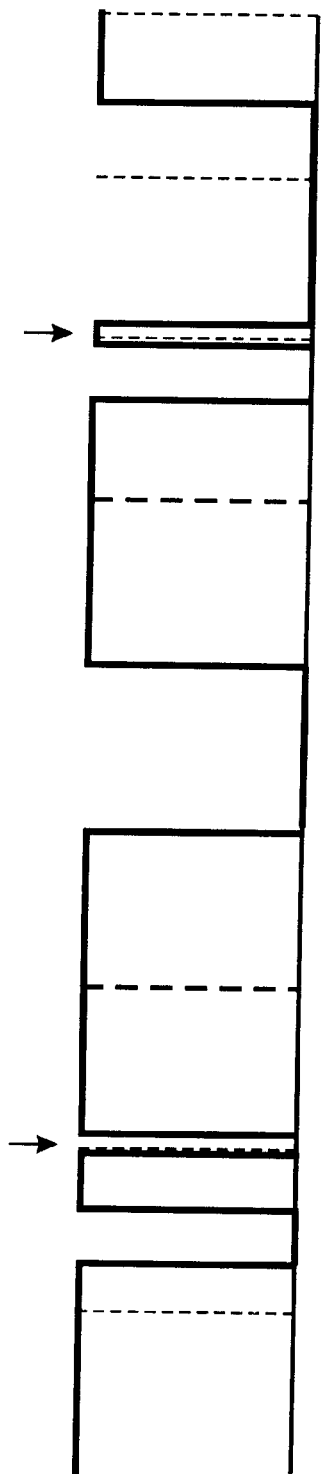
FIG. 4 shows possible false triggers caused by the FIG. 1 process.

The gray to gray error diffusion is an important part of this invention since restricting to nine levels would otherwise produce extensive contouring. It is expected that this error diffusion can be used since most errors collectively passed into a pixel would be less than one half of a level step. They should propagate through the white and black pixels because the white or black would still be the selected level even after modification by ½ level. It is possible in this form for some collective errors to occasionally exceed ½ level and trigger a pegged white or black pixel to select a different level. These undesired pulses would always be a single high-addressability slice in width and so may not cause a significant problem in image quality. Testing of the algorithm is necessary to be sure. FIG. 4 shows where these undesired pulses would occur.

A more robust approach would be to integrate the error diffusion step more closely with the three-pixel redistribution step. This can be accomplished by adding the errors that are passed down from the scanline above before the redistribution within each three-pixel group. The error diffusion step that follows would then be only to add the error passed in from the left or right for each pixel, quantize, compute the new error and distribute. The small error passed in from the left will not cause a false trigger as in the simpler case.

Figure 5:
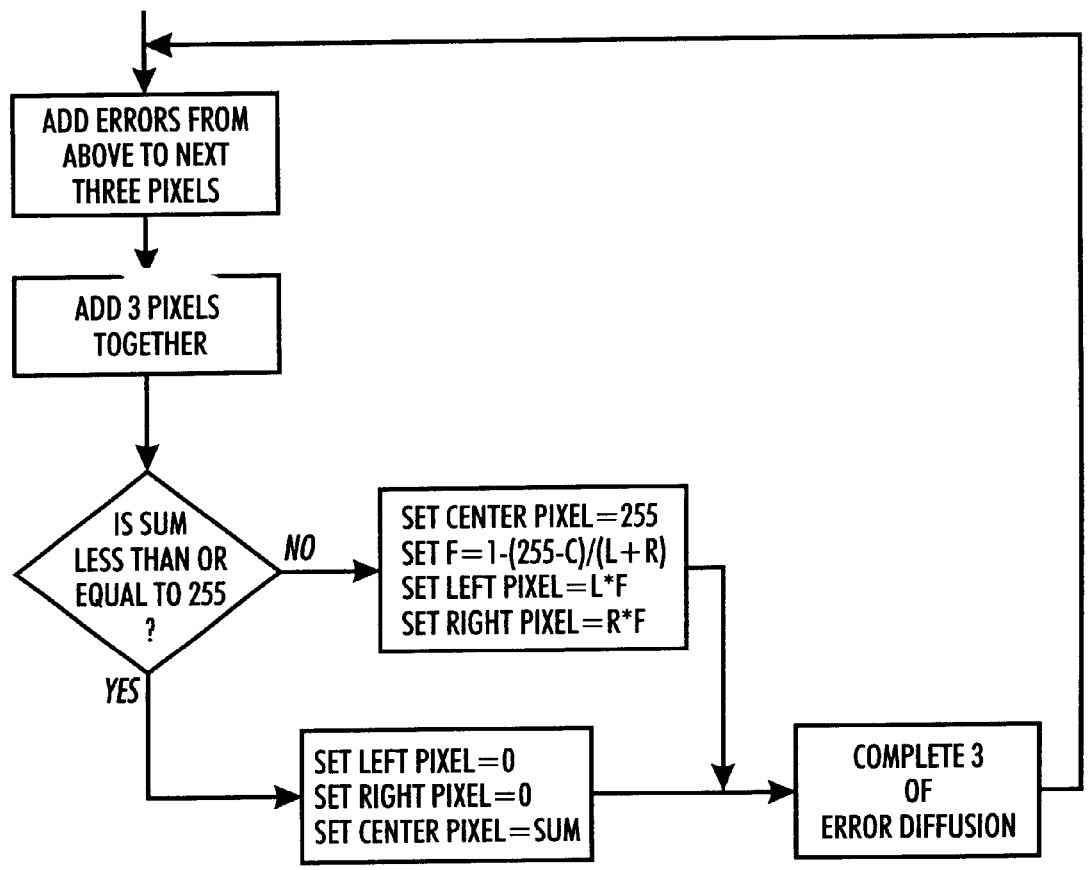
FIG. 5. is a flow chart of a variation of the FIG. 1 process.

FIG. 5 is a flow chart of this process which breaks the one-step error diffusion process of FIG. 2 into a two-phase process. The difference is that in FIG. 5 the error from above is added to the input pixels before the redistribution process as the first error diffusion phase, and the remaining error diffusion calculations are performed as before as the second phase.

Figure 6:
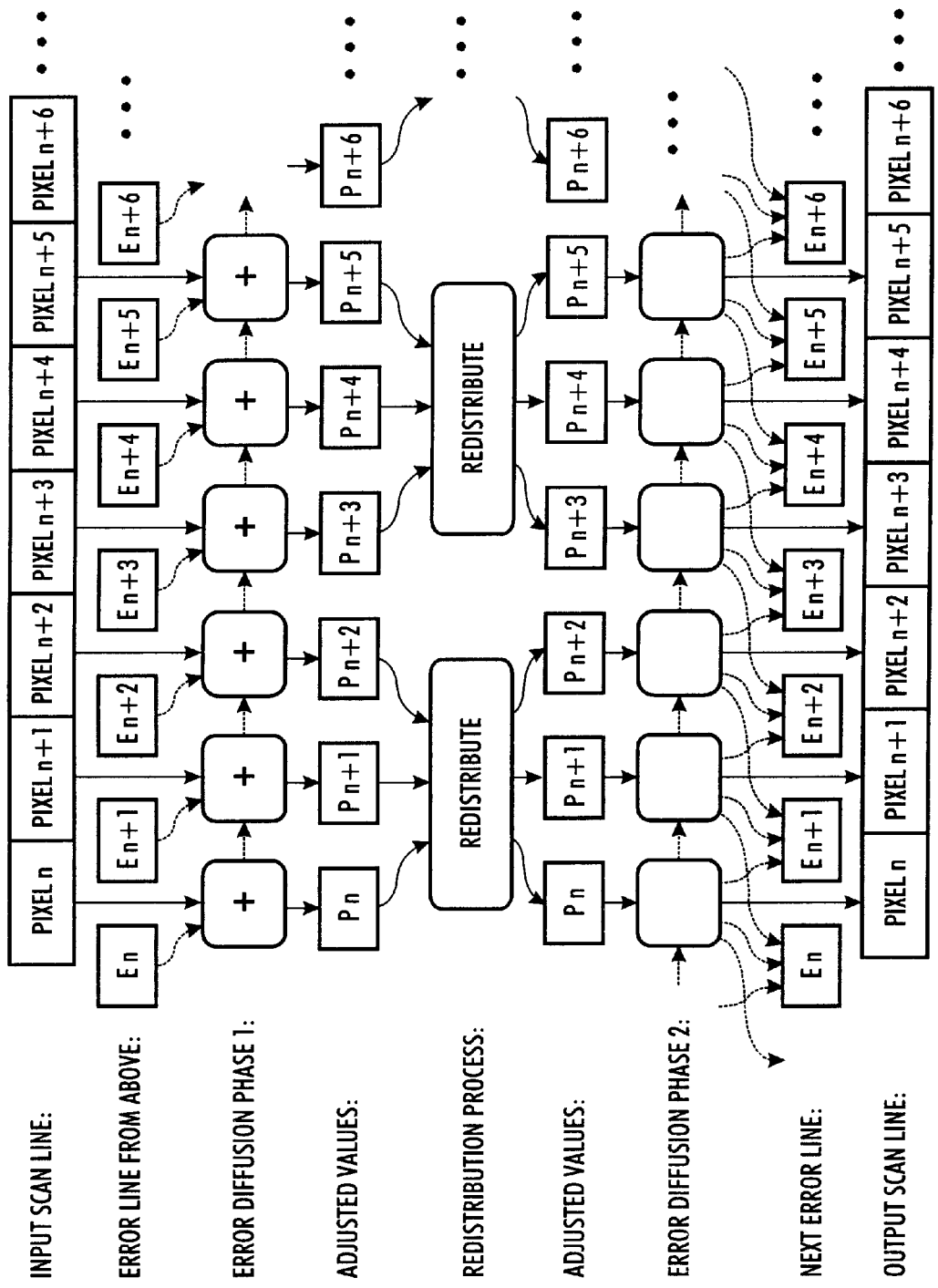
FIG. 6 is a description of the error diffusion for the process of FIG. 5.

FIG. 6 is a more detailed description of the error diffusion of FIG. 5. First, each input scan line pixel is added to the error term from above and these adjusted values are added in the redistribution process to form a line of adjusted pixel values. Now the second part of the error diffusion is accomplished to form from each pixel the four error terms and the output pixel. It can now be seen that in FIG. 2 the entire error distribution process is accomplished after the redistribution step, but in FIG. 6, the error from above is added before the redistribution but the error terms for the next line are not formed until after the redistribution.

Another possible modification that would suppress the triggering of undesired pulses would be to add some tests into the error diffusion operation. These might avoid the difficulty of reading the errors from above out of sequence as in the FIG. 1 case.

In this variation, two flags would be included, one for "pegged white" and one for "pegged black". When one of these flags is set, the error diffusion would be preempted from choosing the nearest level, but would instead be forced to choose the appropriate pegged value. But these flags could be overridden if some conditions changed.

During the three-pixel redistribution operation, one of these flags would be set and the other cleared depending on which branch the redistribution took. Then, during the error diffusion step, if the left pixel chooses black then the "pegged white" flag could be safely ignored for the center pixel. And if the center pixel chooses white then the "pegged black" flag can be safely ignored for the pixel on the right. The halftoning function for the center pixel would need to turn on the sub pixel on the left side of the pixel to be compatible with this variation.

Figure 7:
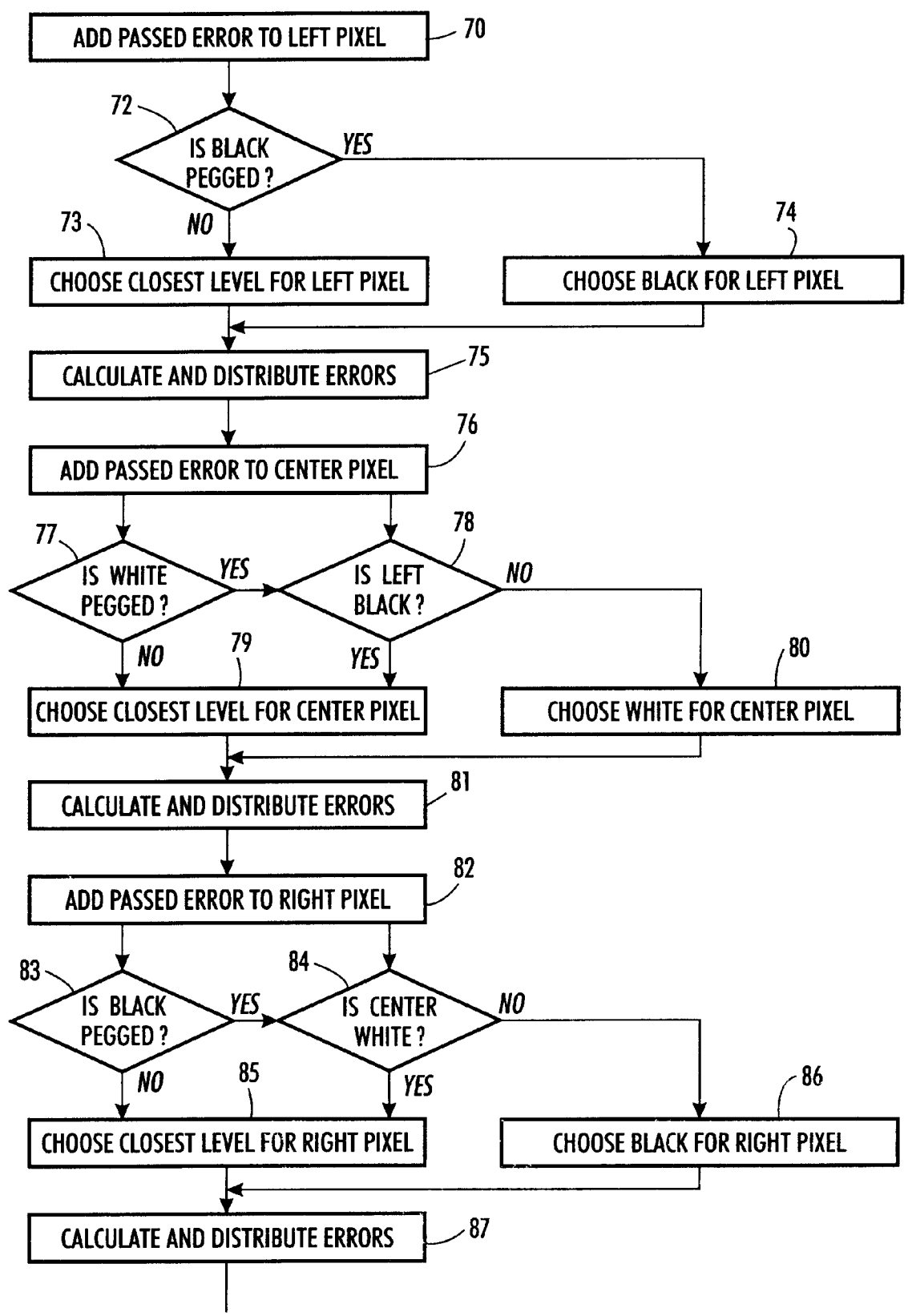
FIG. 7 is a flow chart of another variation of the FIG. 1 process.

The flow chart for this process is shown in FIG. 7, and could be used, for example, instead of the error diffusion process of FIG. 2. In this case the pixels are processed one at a time. In step 71 the left pixel is added to the error from above. If this results in a completely black pixel, step 72, an all black pixel is chosen at step 74 for the left pixel of the three. If the result is not completely black, step 73, the closest level is chosen for the left pixel. At step 75 the error terms for the first pixel are calculated and distributed, including passing the error to the right, to the center pixel, step 76.

If the central pixel, step 77, is all white, and the left is not all black, step 78, then 80, the central pixel is set to all white. Otherwise, 77, the closest level is chosen for the central pixel, the errors are calculated and distributed, 81, and the error from above is added to the right pixel, 82. If the right pixel is all-black, 83, and if the central pixel is not all white, 84, then the right pixel is set to all black, 86. Otherwise, 85, the closest level is chosen for the right pixel and, 87, the errors are calculated and distributed.

FIG. 8 is a more detailed description of the error diffusion process of FIG. 7. Pixel n and its error term are added at error diffusion phase 1. The left pixel is now adjusted as described in steps 72, 73 and 74 of FIG. 7. The result is divided up into the output pixel and four error terms, and at the same time, the right error term of the first pixel is used as an input to the error diffusion phase 1 for the second pixel, which is the center pixel. The adjust center pixel step is the same as described at steps 77 through 80 of FIG. 7. Similarly, the adjust right pixel step of FIG. 8 is described as steps 83 through 86 of FIG. 7.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A method of producing a halftone lisle screen, comprising:

grouping pixels into groups of n pixels, where n is greater than or equal to 3, wherein each n pixel group includes at least a left pixel, a center pixel and a right pixel;

distributing pixel data within each group such that either the center pixel has gray level content or at least one of the left pixel and the right pixel has gray level content;

adjusting the gray level content of the left and right pixels in each group where possible by maintaining the relative darkness ratio of the left and right pixels to preserve high frequency information of the pixel data; and performing a gray-to-gray error diffusion process across the distributed pixels within each n pixel group.

2. The method of claim 1, wherein the step of distributing pixel data within each group comprises:

summing the values of the n pixels;

comparing the sum with a predetermined value;

if the sum is less than or equal to the predetermined value, setting the center pixel to the sum and setting the left and right pixels to zero; and if not, distributing the sum within the left pixel and the right pixel according to a predetermined relationship.

3. The method of claim 2, where n equals 3 and wherein, if the sum is equal to or darker than ⅔ full colorant, the left and right pixels are set to full colorant and the center pixel is set to a shade of gray level; and wherein if the sum is equal to or lighter than ⅓ white, the center pixel is set to white and tee left and right pixels are set to a shade of gray level.

4. The method of claim 2, wherein the step of performing an error diffusion process includes producing a group of output pixels and error terms.

5. The method of claim 4, further comprising:

prior to the step of performing an error diffusion process across the distributed pixels, providing an error term from a preceding line; and adding the error term to the distributed pixels.

6. The method of claim 2, further comprising:

prior to the comparing step, adding an error term from a preceding line to the sum.

7. A method of producing a halftone line screen, comprising:

grouping pixels into groups of n pixels, where n is greater than or equal to 3, wherein each n pixel group includes at least a left pixel, a center pixel and a right pixel;

performing a first part of a gray-to-gray error diffusion process across the pixels within each pixel group by adding an error term from a preceding line to each of the pixels in the pixel groups;

distributing pixel data within each group such that either the center pixel has gray level content or the left pixel and the right pixel have gray level content, so that the average gray level of the pixel group approximates the average gray level of the n pixels;

adjusting the gray level content of the left and right pixels in each group where possible by maintaining the relative darkness ratio of the left and right pixels to preserve high frequency information of the pixel data; and performing a second pan of the gray-to-gray error diffusion process across the distributed pixels within each pixel group by selecting a closest available halftone level for each pixel and distributing any resulting error terms to the unprocessed pixels.

* * * * *